Feb. 4, 1958 H. A. BILLETTER 2,821,772
METHOD OF MAKING FLUID-TIGHT HEAT EXCHANGE TUBES
Filed March 29, 1952 2 Sheets-Sheet 2
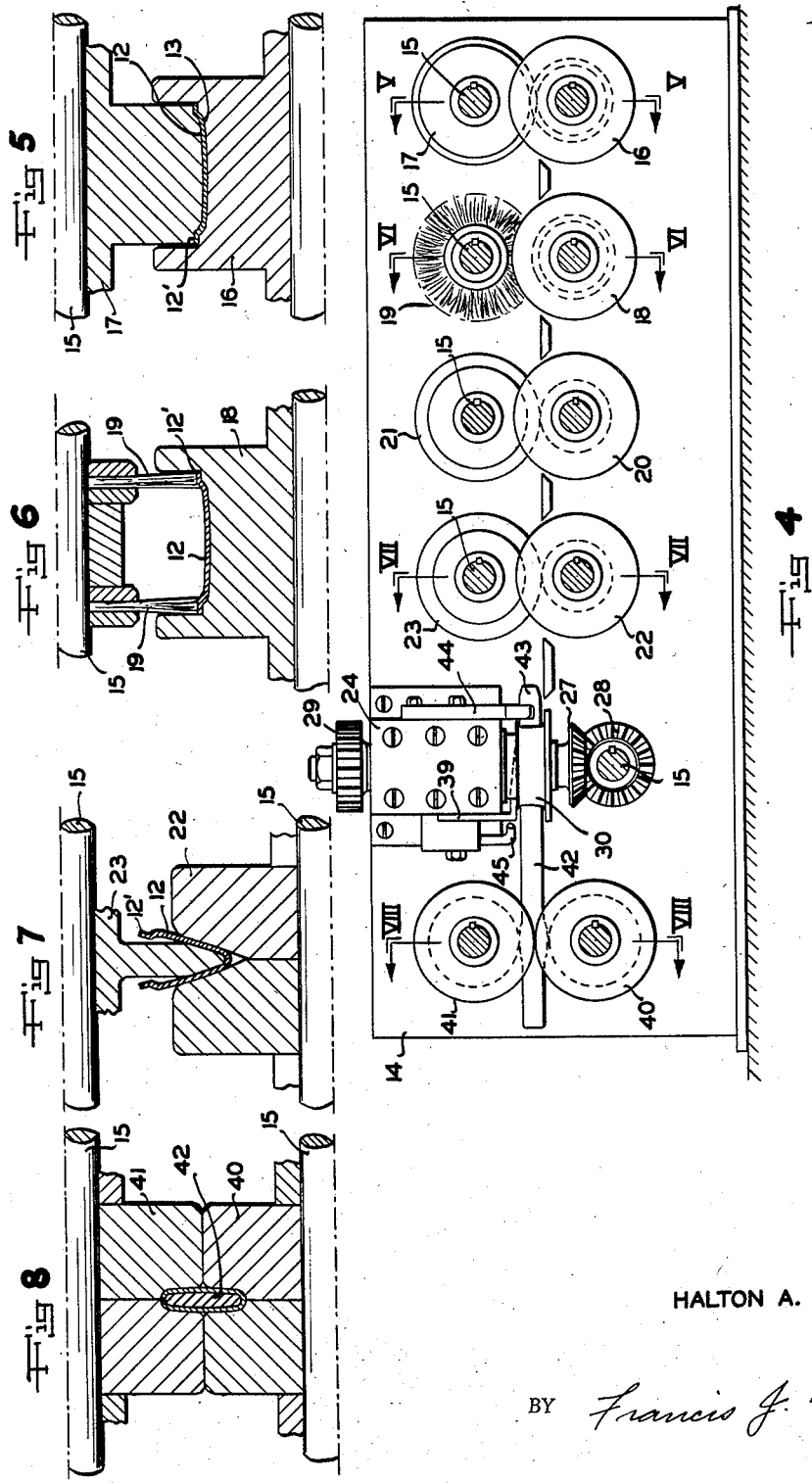
INVENTOR
HALTON A. BILLETTER
BY Francis J. Klempay
ATTORNEY

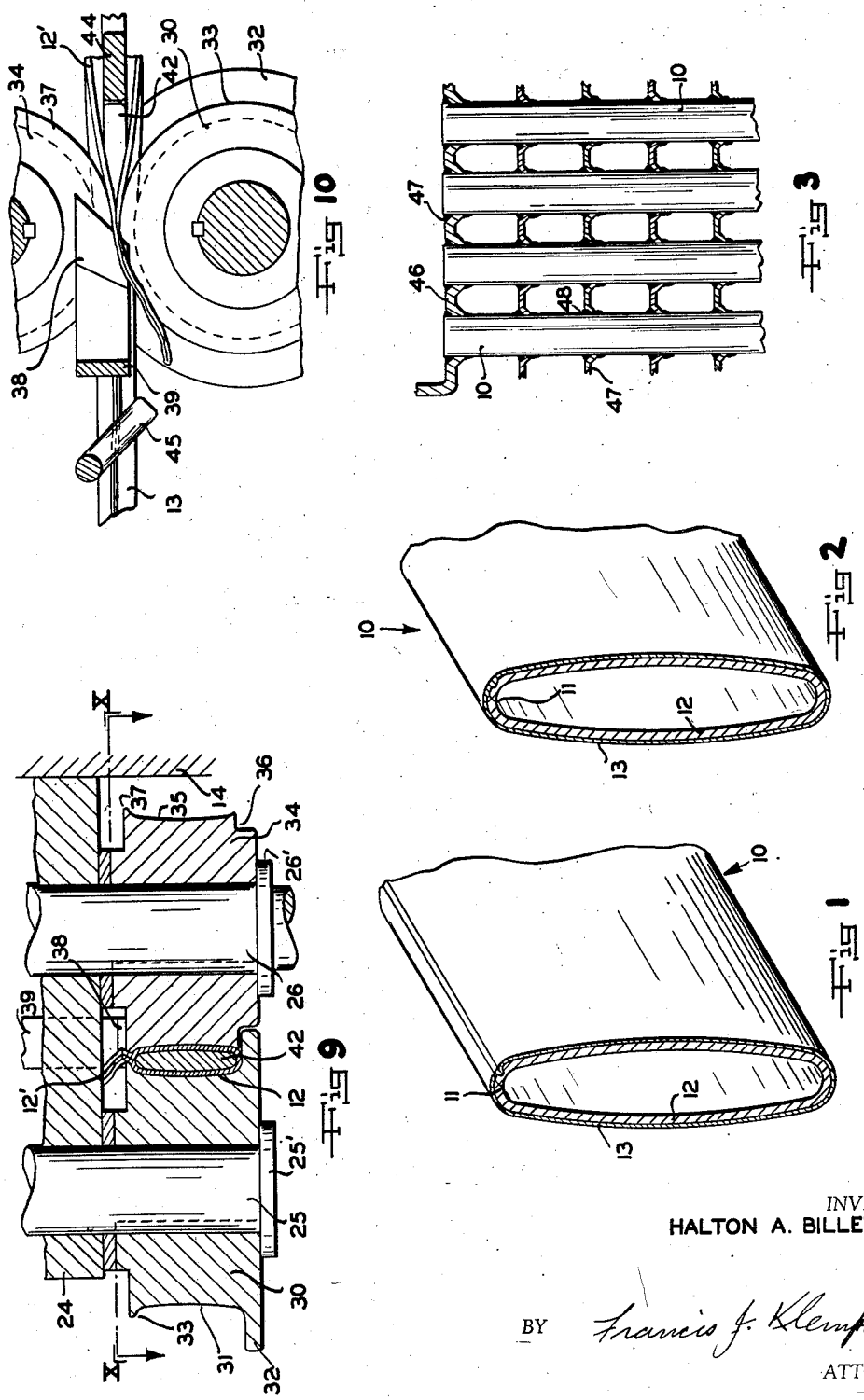

United States Patent Office 2,821,772
Patented Feb. 4, 1958

2,821,772

METHOD OF MAKING FLUID-TIGHT HEAT EXCHANGE TUBES

Halton A. Billetter, Youngstown, Ohio, assignor, by mesne assignments, to Sawhill Tubular Products, Inc., a corporation of Pennsylvania Application March 29, 1952, Serial No. 279,422

1 Claim. (Cl. 29—157.3)

The present invention relates to an improved method of making fluid-tight heat exchange tubes in commercial quantities and more particularly to the art of fabricating non-ferrous metal tubes from thin strip or sheets. Large quantities of small thin-walled tubing of the non-ferrous class having superior heat transmission qualities and corrosion-resistant qualities are required in the automobile radiator industry, for example and heretofore this requirement has been met largely through the use of copper or brass tubing formed from strip and closed by a longitudinal locked seam which is finally rendered fluid-tight by a solder dip. The fluid-tight closing of the locked seam joint either by soldering or brazing has always entailed considerable difficulty and substantial expense and, moreover, has never been entirely satisfactory because of the tendency of the seams to open and thus develop leakers in the process of manufacture of the radiators. Accordingly the need for a seamless or a welded tube in the radiator industry has been recognized for some time. Seamless tubing is much too expensive for the purpose while the welding of the extremely thin-walled tubing normally used in the soft non-ferrous metals desired has heretofore presented insurmountable difficulties particularly when the stock strip is coated or clad with the brazing metal or flux required in assembling the tubes in the fin plates and in the header plates of the radiator core structure. It is accordingly the primary object of the present invention to provide an improved tubular product of thin walled construction and having other characteristics eminently desirable for use in the production of automobile radiators, for example, which is at once both a solidly welded tube and clad with a brazing metal or flux to facilitate the assembly of a radiator core structure of great strength and rigidity in the manner well understood by those familiar with the art. It is a further object of the invention to provide an improved process and apparatus whereby the product of the invention may be expeditiously produced in commercial quantities at low cost.

The use of my invention is particularly advantageous in the construction of automobile radiator cores from aluminum which is presently being sought in great earnest by the industry to reduce consumption of the more critical metal copper. For efficiency and space considerations the sheet metal used in the construction of radiator tubes has a thickness of only about .01 inch and this thin metal is extremely difficult to weld by the usual electric resistance welding method and is impossible to weld by this method when the stock aluminum strip is furnished with a layer of brazing material as is required, in a practical sense, for assembling the tubes in the fin plates and in the header plates. While attempts have been made to fabricate such aluminum brazing strip into radiator tubes by the locked seam method the tubular product of the forming and seaming mill is extremely flimsy due to the inherent lack of bond in the joint, and this flimsiness makes extremely difficult the alignment of the tubes with the apertures in the fin and header plates thereby greatly increasing the cost of manufacturing the radiator structure. Also, since the flow of the brazing material over the heat of the brazing furnace is relied on to fluid seal the locked seam joints inadequately sealed tubes can only be detected in the final assembled core structure. This substantial annoyance and source of loss is entirely avoided by the use of solidly welded tubes which are fluid tight and rigid as they come from the mill and before they are assembled with the fin and header plates in the radiator core structure.

In carrying out my invention I preferably utilize thin strip metallic material such as copper or aluminum which is coated on one side with a suitable brazing material or flux and this strip material is passed through a forming and welding mill in which the forming rolls are so arranged that the tube is bent with the brazing material or flux on its outer surface, in which the imposing edges of the formed tube are provided with radially outward extending flanges, in which these flanges are welded together by the cold welding process using a pair of opposed welding pressure rolls, in which the excess bead of the weld is skived off, and in which the welded tube is finally sized while having its remaining weld bead rolled down smoothly into the general circumferential contour of the tube. Since no heat is used in this process there is no deterioration of the brazing material or flux used and, further, there is no scraping or cutting of the surface of the strip material which makes up the exterior surface of the tubing so that such exterior surface remains properly and completely coated with the brazing material or flux to insure fluid-tight joining with the header plates and rigid mechanical joining with the fin plates in finally assembling radiator core structure in the brazing furnace.

The invention has as its further object the provision of a practical and improved forming and welding mill for the production of tubing from the ductile non-ferrous metals wherein solid continuous longitudinal seam welds may be effected in the metal strip making up the tube stock with a minimum of surface mutilation and wherein the finished tubing is accurately sized and smoothly contoured both exteriorly and interiorly.

The above and other objects and advantages of the invention will become apparent upon consideration of the following detailed specification and accompanying drawing wherein there is disclosed preferred embodiments of the invention.

In the drawing:

Figure 1 is a perspective view of an end of a tube of my invention;

Figure 2 is a view of the tube of Figure 1 after brazing;

Figure 3 is a fragmentary section of a radiator core structure utilizing the tubes of Figures 1 and 2;

Figure 4 is a side elevation of a combined forming and welding mill for producing the tube of Figure 1;

Figures 5, 6, 7 and 8 are fragmentary sectional views taken along the lines V, VI, VII and VIII, respectively, of Figure 4;

Figure 9 is a vertical section through the welding rolls of the apparatus of Figure 4; and Figure 10 is a fragmentary horizontal section taken along the line X—X of Figure 9.

Referring first to Figure 1 it will be observed that the side wall of the tube 10 is formed of a single sheet or strip of material which is formed into the tubular shaped desired and then welded along a longitudinal seam 11. As explained above, it is entirely practical by the use of my process and apparatus to produce a welded tube from a sheet or strip of a ductile non-ferrous metal which has been previously coated with any integrally bonded coat either in the process of manufacture of the sheet or strip or in a separate operation as will be understood. Therefore in the illustration of Figure 1 the sheet-like material making up the tube 10 is shown as having a base metal 12 having an integrally bonded coat 13 on one side thereof. Since the metal 12 is to be welded by the cold pressure welding method it must be of a ductile non-ferrous nature such as copper, annealed brass and aluminum and since the invention finds its greatest present usefulness in the production of brazable aluminum tubes the metal 12 may be considered to be aluminum while the coating material 13 is a brazing compound which is integrally bonded to the aluminum sheet or strip during the process of manufacture thereof. As is well understood by those familiar with the brazing art compound coating 13 may contain appreciable silver, some copper, and lesser quantities of some or all of the softer metals tin, lead and zinc. Insofar as the invention is applicable to the production of tubing from coated sheet or strip stock the primary object of the invention is the production of a tube which is solidly welded along a continuous longitudinal seam, smoothly contoured and accurately sized and covered completely on its outer surface with the coating in an unmutilated condition. The process and apparatus by which such a tubular product is obtained by the present invention will now be described.

In the illustrated embodiment of the tube manufacturing method and apparatus of the invention it is proposed, in accordance with usual practice, to utilize strip stock from a coil and to feed the same continuously through a continuous forming and welding mill. A suitable mill for this purpose is shown in Figures 4 through 10 wherein the reference numeral 14 designates a housing from which extends a plurality of driven shafts 15 which carry the forming and sizing rolls of the assembly and drive the welding rolls in a manner to be later described. The stock enters the machine from the right as viewed in Figure 4 and first passes through the initial forming rolls 16 and 17 which, as shown more clearly in Figure 5, are operative to effect an initial downward bend in the strip stock 12 while allowing side edge portions 12' of the strip stock to remain in a flat condition lying in a horizontal plane. In feeding strip stock which is coated on one side with brazing compound or other material to the mill illustrated in Figure 4 the coated side of the strip is on the bottom.

From the first forming pass 15–16 the strip travels to a wire brushing station where the upper uncoated surface of the side edge portions 12' are subjected to the abrading action of rapidly revolving wire brushes, it being well recognized in the cold pressure welding art that the metal to be welded must be clean and bright and free from all foreign matter. I therefore provide an anvil roll 18 which is contoured similarly to the first forming roll 16 and positioned above the roll 18 in spaced relation on one of the driven shafts 15 are the wire brush wheels 19 which engage the top flat surfaces of the side edge portions 12' of the strip 12. In actual practice, the shaft 15 which carries the wire brushes 19 is driven at a much higher rate of speed than the forming rolls by a suitable motive means, not shown. After leaving the brushing stage the strip passes through further forming stands comprised of the rolls 20—21 and 22—23 which progressively bend the strip into the tubular shape so that as it issues from the last forming pass it is almost closed as shown in Figure 7. The strip then proceeds to the welding mill which will now be described.

Rigidly mounted on the side of the housing 14 is a block 24 which journals a pair of spaced parallel vertical shafts 25 and 26, the latter of which is provided at its lower end with a bevel gear 27 meshing with a bevel gear 28 keyed onto one of the drive shafts 15. Spur gears 29 interconnect the upper portions of the shafts 25 and 26 so that both shafts are power driven but in opposite directions. Keyed to the bottom portion of shaft 25 and retained thereon by a flange 25' which is integral with shaft 25 is a welding roll 30 having an annular groove or recess 31 between its top and bottom faces, a lower integral flange 32 and an upper annular welding rib or land 33. Keyed to the shaft 26 and retained thereon by flange 26' is the second welding roll 34 having an annular groove or recess 35 intermediate its top and bottom ends, a lower shouldered recess 36 to receive the flange 32 and an upper annular welding land 37. By referring to Figure 9 it will be observed that the annular grooves 31 and 35 form a window of cross sectional shape complementary to the circumferential contour of the tube being formed and that the welding lands 33 and 37 engage the contacting fin-like projections which are formed from the side edge portions 12' of the original strip. In actual practice the welding rolls are so contoured and dimensioned that the welding lands 33 and 37 exert such sufficient crushing pressure to the opposite sides of the fin-like projections 12' that the latter are effectively welded together along a continuous longitudinal seam while being reduced in total thickness to something less than the original thickness of one of the projections, all in accordance with well understood principles of cold pressure welding. It should be observed, however, that the welding takes place between uncoated surfaces of the original strip and along the wire brushed areas of such surface.

In the cold pressure welding process there is much plastic flow of metal in a direction transverse to the direction of application of the welding force and the welding lands 33 and 37 of the welding rolls are preferably so contoured that most of this flow takes place in an upward direction from the welding throat between the lands 33 and 37. Thus the welded fin as formed from the projections 12' is vertically elongated and of a ragged nature and must be removed from the finished tube. This is accomplished by means of a knife 38 which is carried on an L-shaped bracket 39 rigidly secured to and depending downwardly from the block 24 and as shown in Figures 9 and 10 the knife 38 rests on flat upper end surfaces of the rolls 30 and 34 immediately above the welding lands 33 and 37. The knife 38 is positioned to engage the welded fin a fraction of an inch past the welding throat line of the mill and while the fin is yet securely clamped in the welding throat. The welding lands 33 and 37 are preferably so ground that the actual welding of the fin takes place at an angle, as shown in Figure 9, whereby a sharp knife-like edge may be ground at the top of the welding land 33. This sharp edge cooperates with the knife 38 to make a two-bladed shear to neatly trim off that portion of the welded fin which projects above the welding lands 33 and 37 and along the line of minimum thickness of the welded fin. In fact, the upper end portions of the welding lands 33 and 37 are only slightly spaced from each other during actual operation. As shown in Figure 10, the knife 38 has its cutting edge heavily biased and in a direction tending to throw the welded fin against the sharp upper edge of the welding land 33 of the roll 30.

I provide a pair of opposed planishing and sizing rolls 40 and 41 which are annularly grooved as shown in Figure 8 to provide a window-like pass which is exactly equal in shape and dimension to the shape and dimension desired for the exterior of the finished tube. Extending through this pass and also through the tube pass between the welding rolls is an elongated mandrel 42 which is shaped complementary to the inner shape of the tube and it will be observed that the forward end of the mandrel 42 is pointed as shown in Figure 4 at 43 and positioned just ahead of the welding rolls 30 and 34. The mandrel 43 is restrained against longitudinal movement by a thin bar 44 which is secured to one face of the block 24 and has its lower end received in a slot formed in the end portion of the mandrel. The mandrel is securely entrapped in general position otherwise by the passes in rolls 40—41 and 30—34 and by the flange 32 of the roll 30. Of course, when no stock is in the mill the mandrel 42 drops down slightly but upon stock being forced through the mill the mandrel is forced to assume its centered position as shown in Figures 8 and 9 as will be understood.

Since, as explained above, it is desirable that the entire outer surface of the finished tube be covered with the original coating material on the strip stock I provide means in the form of an angularly disposed and rounded deflecting bar 45 (see Figures 4 and 10) which engages the welded fin or bead remaining after the knife 38 and progressively rolls over or bends such remaining bead or fin so that the upper surface of the tube at this stage is still completely coated with the original strip coating. Now as this bent-over bead or fin goes into the planishing and sizing roll 41 the same is flattened out and mashed down into the general circumferential contour of the finished tube and the entire exterior surface of the finished tube remains completely coated. If desired, I may replace the deflector 45 with an angularly disposed roll as will be readily understood.

A coated tube produced by the above described method and apparatus possesses substantial advantages over coated tubular products heretofore produced since the same while being produced continuously and in a most economical manner is at once both a rigid structure and a fluid impervious structure due to the continuous line of weld. While there are many applications for such a product the same is especially advantageous for such products as automobile radiator cores because the initial rigidity of the tubing facilitates the assembly of the product, no solder or brazing is required to render the tubing fluid-tight, and the uninterrupted coating of the external surface of the tubing by the brazing compound initially on the strip facilitates the attachment (by brazing) of the tubes to the header and fin plates of the assembly. Further, since the coating of brazing compound on the exterior surface of the tubes is entirely undisturbed this material is available in the brazing phase of the final assembly to close up any possible interstice resulting from any defective welding so that the occurrence of defective products due to leakage is completely obviated. Such a welded and brazed tube is shown in Figure 2.

It should be obvious that the apparatus of the invention may be used to produce uncoated tubes, if desired, and that the method of the invention for finishing the tubes by accurately and cleanly cutting off the excess bead, by bending over the remaining bead and by rolling down the bent-over welded bead portion is generally advantageous in the production of any tube since the tube will have added strength and pleasing appearance.

For the welding of fairly soft aluminum stock having a thickness of .010 inch I have found that statisfactory results are achieved if the axial length of the welding lands 33 and 37 of the rolls 30 and 34, respectively, are from .025 inch to .030 inch, and if the welding rolls are otherwise so proportioned that the total thickness of the finished weld (two thicknesses of stock) is of the order of .060 to .070 inch. This reduction as caused by the welding pressure applied is sufficient to cause such metal flow as is required to effect a complete and continuous weld by the cold welding process as above mentioned. It should be understood, of course, that when fabricating stock of different thicknesses and characteristics that changes may be required in the specifications to achieve optimum results.

A desirable feature of the apparatus of the invention is the slanting of the welding lands 33 and 37 of the rolls 30 and 34, respectively (about 15 degrees from the vertical) since this not only facilitates the shearing off of the excess welding bead as explained above but also facilitates the easy and progressive rolling over or bending of the remaining fin into the peripheral outline of the completed tube. By the use of this arrangement there is less danger of creasing or otherwise damaging the fin and less tendency to scrape off any of the coating of the stock so that the finished tube will be completely and uniformly covered with coating while the outer surface of the finished tube will be smooth and uniformly contoured.

Another desirable feature of the apparatus of the invention is extension of the flange 32 of the welding roll 30 radially outward to position horizontally beyond the bottom of the mandrel 42 and tube 12 to thereby avoid any tendency of the tube being formed to be pinched and ribbed along its bottom edge. With my process and apparatus the formed and welded tubes are very accurately sized and contoured to facilitate their use and subsequent fabrication such as in the assembly of automobile radiator cores, for example.

The above specifically described embodiments of the invention should therefore be considered as illustrative and the subject matter of the appended claim taken as determinative of the scope of the invention.

Having thus described my invention what I claim as new and desire to secure by Letters Patent is:

The method of making a fluid-tight heat exchange tube comprising the steps of providing a strip of ductile nonferrous metal having a fusible coating integrally bonded to one side thereof, forming said strip into a generally tubular shape with the abutting edge portions thereof bent outwardly of the main body of the tube and with said coating on the exterior wall of said tube, homogeneously bonding the abutting uncoated edge portions of said strip to form a fluid-tight tube, bending said outwardly bent portions into substantially flush relation with the outer contours of said tube, and heating said tube sufficiently to fuse said coating to provide a layer thereof about said exterior wall.

References Cited in the file of this patent

UNITED STATES PATENTS

| | | |
|---|---|---|
| 132,485 | Newton | Oct. 22, 1872 |
| 261,188 | Wake | July 18, 1882 |
| 521,048 | Ryan | June 5, 1894 |
| 773,563 | Ginn | Nov. 1, 1904 |
| 1,267,379 | Cook | May 28, 1918 |
| 1,832,719 | McBerty | Nov. 17, 1931 |
| 1,969,579 | Rippel | Aug. 7, 1934 |
| 2,014,983 | Quarrestrom | Sept. 17, 1935 |
| 2,078,546 | Sabell | Apr. 27, 1937 |
| 2,177,104 | Gonser | Oct. 24, 1939 |
| 2,203,319 | Anderson | June 4, 1940 |
| 2,252,211 | Seemiller | Aug. 12, 1941 |
| 2,300,850 | Wolcott | Nov. 3, 1942 |
| 2,417,662 | Rosales | Mar. 18, 1947 |
| 2,454,624 | Boerger | Nov. 23, 1948 |
| 2,522,408 | Sowter | Sept. 12, 1950 |
| 2,639,633 | Sowter | May 26, 1953 |
| 2,693,632 | Heussner | Nov. 9, 1954 |

FOREIGN PATENTS

| | | |
|---|---|---|
| 644,795 | Great Britain | Oct. 18, 1950 |